United States Patent [19]
Furukawa

[11] Patent Number: 4,731,774
[45] Date of Patent: Mar. 15, 1988

[54] DISC PLAYBACK APPARATUS

[75] Inventor: Shunsuke Furukawa, Tokyo, Japan

[73] Assignee: Sony Corporation, Tokyo, Japan

[21] Appl. No.: 18,845

[22] Filed: Feb. 24, 1987

Related U.S. Application Data

[63] Continuation of Ser. No. 635,606, Jul. 30, 1984, abandoned.

[30] Foreign Application Priority Data

Jul. 30, 1983 [JP] Japan .................................. 58-140749

[51] Int. Cl.$^4$ ............................................... H04N 5/76
[52] U.S. Cl. ..................................................... 369/59
[58] Field of Search ............................ 369/59; 360/32

[56] References Cited

U.S. PATENT DOCUMENTS

| | | | |
|---|---|---|---|
| 3,623,039 | 11/1971 | Barham ................................. | 360/48 |
| 4,001,883 | 1/1977 | Strout et al. ......................... | 360/48 |
| 4,380,029 | 4/1983 | Bode . | |
| 4,422,111 | 12/1983 | Moelleo et al. ....................... | 360/48 |
| 4,512,006 | 4/1985 | Murakami et al. ................... | 369/59 |

FOREIGN PATENT DOCUMENTS 2101356 5/1982 United Kingdom .

OTHER PUBLICATIONS

Wireless World, vol. 88, Oct. 1982, No. 1561, Sheepen Place, Olchester, Great Britain.
Electrical Design News, vol. 27, Sep. 1982, No. 17, Boston, Mass., U.S.A.

Primary Examiner—Vincent P. Canney
Attorney, Agent, or Firm—Lewis H. Eslinger; Alvin Sinderbrand

[57] ABSTRACT

A disc playback apparatus cooperates with a disc on which main digital data and subdigital data have been recorded. The apparatus selectively reproduces the main digital data, which it locates with the aid of the subdigital data. A predetermined amount of data is organized into FRAMEs, and the FRAMEs are assembled into BLOCKs. A header signal including a predetermined number of bytes each indicating the digital value "0" is at the beginning of each BLOCK. The length of the header signal corresponds to the relative variation of time base between the the reproduced main digital data and the reproduced subdigital data. An address signal follows the header signal and includes a start signal having bits of digital value of "1" and following address data consisting of a predetermined number of bytes indicating one address.

10 Claims, 9 Drawing Figures

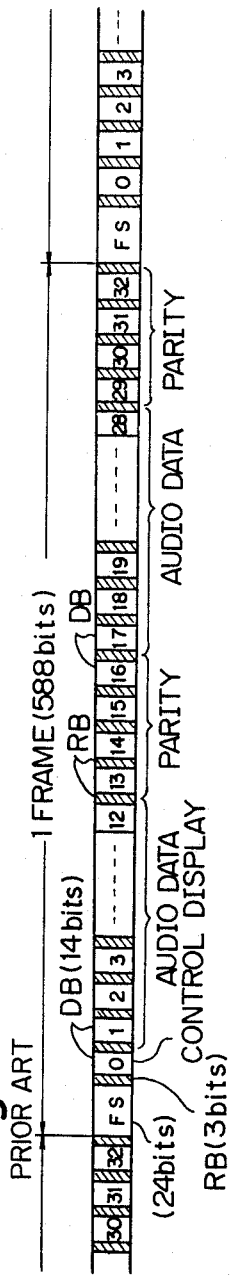
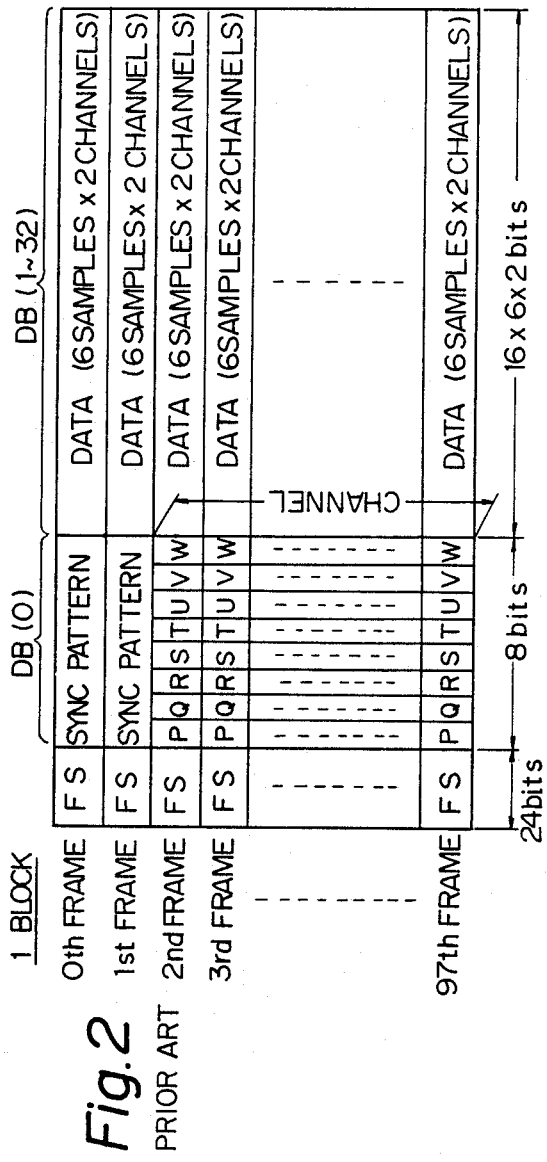

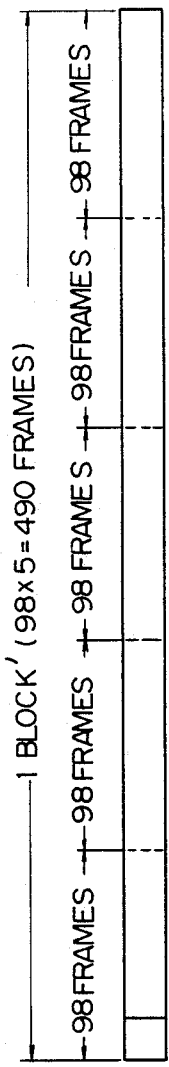
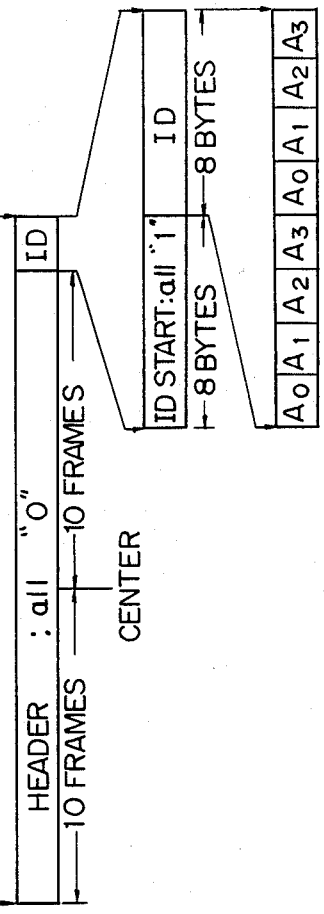
Fig.3A Fig.3B Fig.3C Fig.3D

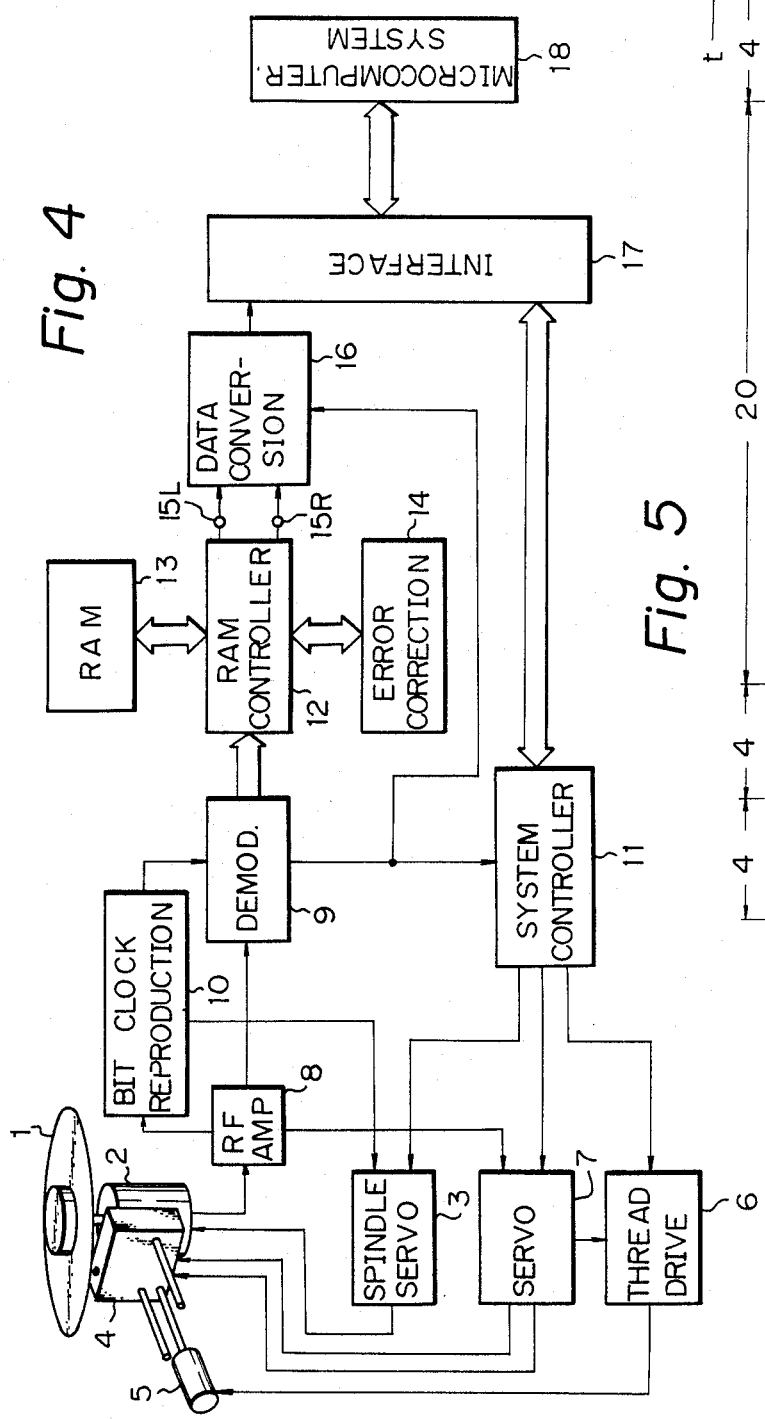
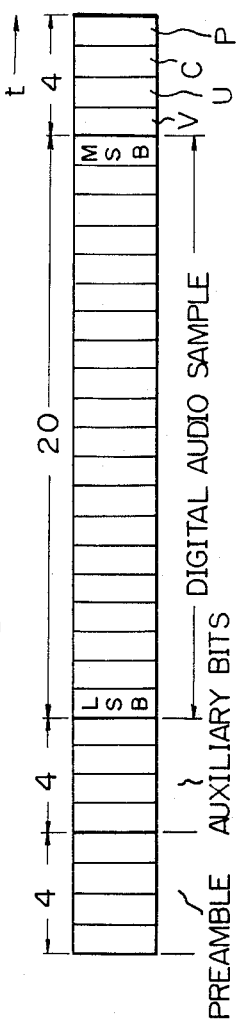
Fig. 4
Fig. 5

DISC PLAYBACK APPARATUS

This is a continuation of application Ser. No. 635,606, filed July 30, 1984, now abandoned.

THE BACKGROUND OF THE INVENTION

1. Field of the Invention

This invention relates to a disc playback apparatus which uses a digital disc on which two-channel digital audio signals are recorded, and which memorizes digital data other than these two-channel digital audio signals.

2. Description of the Prior Art

A system using an optical digital audio disc (referred to as a compact disc) is a disc system which can reproduce high quality stereophonic musical sounds. If digital data such as data representative of characters, display data, program data, etc. other than stereophonic musical sounds can be reproduced by this disc system without significantly modifying the arrangement of the player, it will be possible to realize a playback apparatus for reproducing visual information such as charts and statistics by graphics, pictorial illustration by still pictures, and a video game apparatus by adding a display unit, thereby providing a wide applicable range for a compact disc system. The data memory capacity of the current compact disc is about 500M bytes, and therefore, a compact disc has a very great advantage as compared with the memory capacity of a standard flexible disc.

On the other hand, compact discs are principally utilized for reproduction of audio signals, thus, the beginning of the data on the disc is searched on a relatively large unit basis such as music program unit or phrase unit. However, as a memory device, the data have to be read out on a smaller unit basis in the order of 128 bytes to 10K bytes. For searching of the beginning of the data, a sub-coding signal is recorded on the compact disc together with the digital audio data. The reproduced digital audio data is written in a RAM (Random Access Memory) synchronously with a reproduced bit clock signal, and read out from the RAM by a reference clock signal. It is necessary for error correction, error interpolation and elimination of variation of time base (hereafter called jitter) to write the reproduced digital audio data in the RAM. The sub-coding signal is different from the digital audio data in that a complicated error correction code therefor is not processed or written in the RAM. Therefore, the reproduced sub-coding signal includes a jitter component. Because of that, a time lag exists between the reproduced main channel digital audio data and the reproduced sub-coding signal, and this time lag is not constant and always fluctuates.

Because of the time lag, even if the main digital data recorded on a compact disc is accessed with the use of the sub-coding signal, there is the possibility that a desired data block will not be accurately read out.

OBJECTS AND SUMMARY OF THE INVENTION

It is an object of the present invention to provide a disc playback apparatus which can read out digital signals of programs, data or the like in place of digital audio signals by utilizing a disc playback apparatus for the standard digital audio as it is or by modifying only a part thereof.

It is another object of the present invention to provide a disc playback apparatus which accesses data accurately, even if a relative time variation is contained between the main channel digital data and the sub-coding signal which is inserted to access the main data.

It is a further object of the present invention to provide a disc playback apparatus which can play back a disc memory device having a much larger memory capacity than a conventional flexible disc, and can read out the digital signal on a unit basis that is amount suitable for handling.

It is a still further object of the present invention to provide a disc playback apparatus which can reproduce from a disc recorded digital data other than stereophonic musical signals while maintaining consistency with respect to the signal format and signal processing such as the error correcting method and recording data format, or the like, of a disc for playing back stereophonic musical signals such as an already commercially available compact disc, It is a still further object of the present invention to provide a disc play back apparatus which can play back various picture information and audio information, thereby enabling enlargement of an application range of the disc, by adding a data processing section such as a micro-computer, color CRT, and speaker in order to adapt the standard disc player to these new applications.

According to the present invention, there is provided a disc playback apparatus for use with a disc on which main digital data have been recorded and on which sub-digital data to selectively reproduce this main digital data have also been recorded, wherein a predetermined number of the main digital data constitute one BLOCK, and a header signal is included in the beginning of each of the BLOCK with, an address signal following said header signal.

BRIEF DESCRIPTION OF THE DRAWINGS

FIGS. 1 and 2 are schematic diagrams which are used to describe the data arrangements of the recording data of a compact disc to which this invention is applied;

FIG. 3 consisting of A through D is a schematic diagram showing the arrangement of one BLOCK upon recording the digital data in one embodiment of this invention;

FIG. 4 is a block diagram showing an overall arrangement of one embodiment of this invention;

FIG. 5 is a schematic digram showing a word format of the serial data in one embodiment of this invention.

THE PREFERRED EMBODIMENTS OF THE INVENTION

Figure 6:
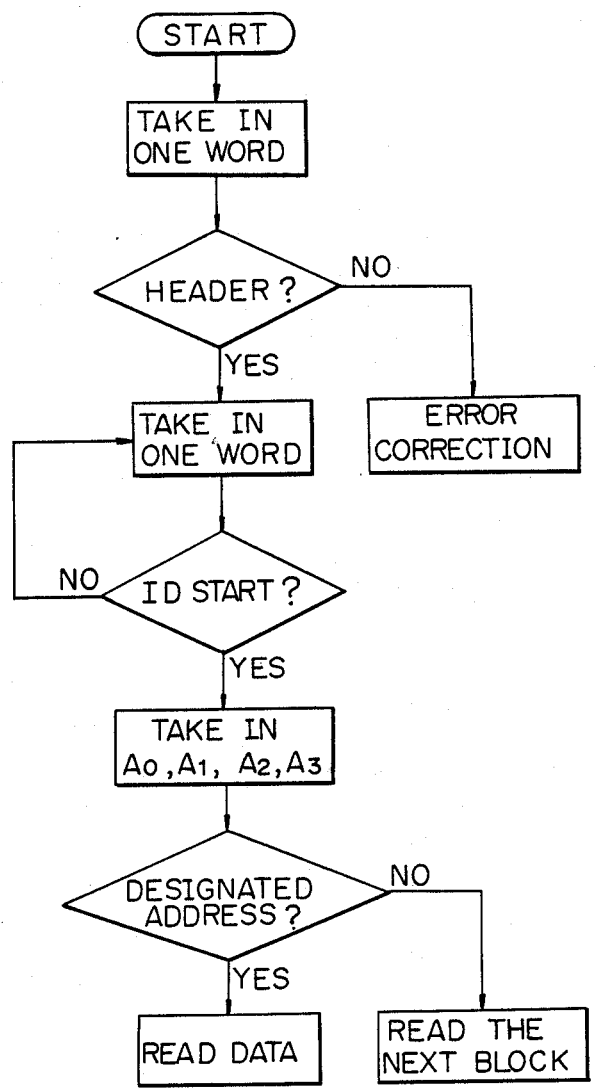
FIG. 6 is a flow chart showing the operation of one embodiment of this invention.

In an embodiment of the present invention, the present invention is applied to a compact disc.

The data arrangement of the signal to be recorded on a compact disc will be described with reference to FIGS. 1 and 2.

FIG. 1 shows the data stream recorded on a compact disc. One FRAME consists of 588 bits of record data, and each FRAME has at its head a frame sync pulse FS followed by 3-bit DC-restriction bits RB. Thereafter, the 0th to 32nd data portions DB each having 14 bits and the 3-bit DC-restriction portions RB are further recorded alternately. The 0th bits among these data portions DB are called a subcoding signals or user's bits, and used to control the playback of a disc and to display the relating information or the like. The 1st to 12th and 17th to 28th data portions DB are assigned for audio data in the main channel. The remaining 13th to 16th and 29th to 32nd data portions DB are assigned for parity data of the error correction code in the main channel. Each of the data portions DB consists of 14 bits into which the 8-bit data have been converted by the 8 to 14 conversion upon recording.

FIG. 2 shows the stage of one BLOCK (98 FRAMEs) in that 98 FRAMEs are arranged sequentially in parallel, wherein each of the data portions DB is represented by 8 bits and the DC-restriction bits are excluded. The sub-coding signals P to W in the 0th and 1st FRAMEs from the sync patterns which are predetermined bit patterns. For the Q channel, the CRC codes for error detection are inserted in the latter 16 FRAMEs of the 98 FRAMEs.

The P channel signal is a flag to indicate a music program and a pause, and has a lower level throughout the duration of a music program and a higher level throughout the duration of a pause, and has pulses of 2 Hz period in the lead-out section. It is possible to select and playback the specified music program by detecting and counting this signal in the P channel. The Q channel enables more complicated control of this type of digital audio disc apparatus. For example, when the Q channel information is stored in a micro-computer equipped in the disc playback apparatus, it is possible to shift quickly from one music program to another during the playback of a music program; thus, respective ones of the recorded music programs may be selected at random. The other R through W channels can be used to indicate or explain by audible voice an author, composer, explanation, text, or the like of the music programs recorded on the disc.

The 98 bits in the Q channel are arranged as follows: the first two bits are used for a sync pattern; the next four bits; the for control bits; further next four bits; the for address bits; following 72 bits for data bits; and at the last a CRC code for error detection is added. A track number code TNR and an index code X are included in the 72 bits that are used for the data bits. The track number code TNR can be varied from 00 to 99, and the index code X can be likewise changed from 00 to 99. The track number code TNR can be used to distinguish the lead-in track (TNR=00), the lead-out track (TNR=AA) and the various units of music on the disc. The index code X is employed to further separate the separating units of the track number code TNR, and is used to indicate, for example, the movement number in symphonic music. In this embodiment "00" indicates a pause and "01" to "99" indicate various index numbers. Furthermore, the data in the Q channel contains a time indication code representative of the time durations of music programs and pause, and a time indication code indicative of an absolute time duration that continuously changes from the beginning to the end on the most outer rim side in the program area of the compact disc. These time indication codes comprise the codes indicating minute, second and FRAME each consisting of two digits. One second is divided into 75 FRAMEs. In order to access the compact disc, containing digital data, on a shorter unit basis than a compact disc containing music, the time indication code in the Q channel providing the above mentioned absolute time duration is used.

As described above, a minimum unit of change of a sub-coding signal for a compact disc is 98 FRAMEs. In this embodiment, in case of recording digital signals other than the stereophonic musical signals, which digital signals are as shown in FIG. 3A, one BLOCK is constituted by the length of (98×5)=490 FRAMEs. The beginning of the one BLOCK includes a header signal and an ID signal. The remaining FRAMEs other than the header signal and ID signal have the data format as shown in FIG. 1, in which, instead of the audio digital data as shown in FIG. 1, digital data of byte unit such as data representative of characters, display data, is inserted.

One FRAME includes the digital data consisting of 24 bytes so that one BLOCK includes digital data of approximately 11K bytes. The track number codes TNR of P data and Q data of the sub-coding signal included in same BLOCK are same, and the index code X of the Q data varies 01 to 05 so that specific one BLOCK can be retrieved by the sub-coding signal. As shown in FIG. 3B, the beginning of one BLOCK is added with the header signal consisting of data bits all indicating "0" throughout the first 20 FRAMEs. The center position of the header comes to the beginning position of the BLOCK, when no jitter component is included in the reproduced sub-coding signal at all. As reservation for the jitter, a width of ±10 FRAMEs is provided. The jitter component which is caused during the reproduction of the conventional compact disc is ±4 FRAMEs so that it is not feared that the header signal of the above mentioned length can not be reproduced because of the jitter component.

Following the end of the header signal, the ID mark is provided. The ID mark consists of, as shown in FIG. 3C, an ID start signal of 8 bytes including data bits all indicating "1" and an ID signal of 8 bytes, on which, as shown in FIG. 3D, 4 bytes of A0, A1, A2 and A3 are written twice. The ID signal of 4 bytes is an address signal of every BLOCK.

The digital signals in the format shown in FIG. 3 can be recorded on a compact disc in the same manner as on an audio compact disc. That is, a digital signal to be recorded is supplied to a digital input terminal of a digital audio processor and this digital signal is converted into a video signal format, thereby recording it using a VTR of the rotary head system. In this case, TOC (table of contents) data to generate a sub-coding signal is preliminarily recorded in the audio track in the starting edge section on magnetic tape on which this digital signal will be recorded. Next, the TOC data reproduced from this magnetic tape is supplied to a sub-coding generator, the reproduced digital signal is supplied to an encoder, the sub-coding signal is further supplied to this encoder, and then a laser beam is modulated on the basis of an output of the encoder. A master disc is made by means of this modulated laser beam.

As another method of recording a digital signal, there is a method whereby, for example, a hard disc memory that can be accessed at a high speed is accessed by a mini-computer and a digital signal is supplied in real time to an encoder of a cutting system.

FIG. 4 shows an arrangement of one embodiment of this invention. In FIG. 4, a reference numeral 1 denotes a compact disc on which a digital signal of the above described format has been spirally recorded. The compact disc 1 is rotated by a spindle motor 2. In this case, the spindle motor 2 is controlled by a spindle servo circuit 3 so that the compact disc 1 rotates at a constant linear velocity.

A numeral 4 indicates an optical head, which has a laser source for generating a laser beam for pickup, beam splitter, optical system such as objective lens or the like, photoreceptive device for receiving the reflected laser beam from the compact disc 1, etc. The optical head 4 can be moved in the radial direction of the compact disc 1 by a thread feed motor 5. The thread feed motor 5 is driven by a thread drive circuit 6. The optical head 4 can be deflected both in the direction perpendicular to the signal surface of the compact disc 1 and in the direction parallel thereto, and it is controlled so that the focusing and tracking of the laser beam upon playback are always properly performed. For this purpose, a focusing and tracking servo circuit 7 is provided.

A reproduction signal of the optical head 4 is supplied to an RF amplifier 8. The optical head 4 is provided with a focus error detecting section consisting of a combination of, for example, cylindrical lens and 4-dividing detector, and a tracking error detecting section using three laser spots. This servo error signal is supplied to a focusing and tracking servo circuit 7. An output signal of the RF amplifier 8 is supplied to a digital demodulator 9 and a bit clock reproduction circuit 10. The digital signal recorded on the compact disc 1 has been EFM modulated. The EFM modulation is a method of BLOCK converting 8-bit data into a preferable 14 bit pattern. (i.e. 14 bits such as to provide a long minimum transition time period of the modulated signal and reduce its low-frequency component) The digital demodulator 9 is constituted in such a manner as to carry out the demodulation of EFM. The bit clock fetched by a bit clock reproduction circuit 10 is supplied to the digital demodulator 9 and the spindle servo circuit 3.

The sub-coding signal is separated by the digital demodulator 9 and this separated sub-coding signal is supplied to a system controller 11. The system controller 11 is equipped with a CPU, and the rotating operation of the compact disc 1, thread feeding operation, reading operation of the optical head 4, or the like are controlled by the system controller 11. Control commands are supplied to the system controller 11 through an interface 17, that will be described later. Namely the reading operation of a desired digital signal from the compact disc 1 using the sub-coding signal is controlled by the system controller 11.

The main digital data output from the digital demodulator 9 is supplied through a RAM controller 12 to a RAM 13 and an error correction circuit 14. The processings with respect to the elimination of variation of the time base, error correction and error interpolation are carried out by the RAM controller 12, RAM 13 and error correction circuit 14, so that the main digital data is fetched from terminals 15L and 15R. Upon playback of a compact disc on which audio data has been recorded, D/A converters are connected to these terminals 15 and 15R, respectively. In case of FIG. 4, no D/A converter is provided to fetch the digital data as it is from the outputs, and the reproduced digital data is supplied to a data converter 16. The reproduced sub-coding signal is also supplied to this data converter 16, and the reproduced data is converted into the form of serial signal.

This serial signal is supplied to the interface 17, and the data for the system controller 11 is supplied from a micro-computer system 18 through the interface 17 to the controller 11. The interface 17 includes the micro-computer system 18 to detect the header signal and to read out the ID signal and so on. The micro-computer system 18 specifies a readout address with the ID signal and applies control signals such as start signals in addition to this readout address to the interface 17 and system controller 11. A list showing correspondence of the sub-coding signal and the ID signal to the address has been recorded in the lead-in track in the most inner rim section on the compact disc 1 using the sub-coding signal as addresses. This list is reproduced in the initial state to start the readout of the compact disc 1 and is read by the micro-computer system 18 in the interface 17.

FIG. 5 shows an example of the word format of the serial signal output from the data converter 16. For this serial signal, one WORD consists of 32 bits; the first four bits are for preamble; next four bits for auxiliary bits of the audio data; and next 20 bits for digital audio sample. In the case where the digital audio sample consists of 16 bits, 16 bits from the least significant bit (LSB) are inserted. Four bits are added after the digital audio sample. Among the four bits, the first bit indicated by V is a flat to show whether the digital audio sample of that word is effective or not; bit U is each bit of the sub-coding signal; bit C is a bit to identify the channel; and bit P is a parity bit. This bit U of the sub-coding signal is inserted into each word format one bit by one and these inserted bits are sequentially transmitted.

In one embodiment of the present invention, a read instruction to a predetermined address is first executed by the micro-computer system 18. This address and control signal are supplied to the micro-computer system 18 in the interface 17. The address is converted to the corresponding sub-coding signal in the interface 17 and the latter is supplied to the system controller 11. The system controller 11 controls the thread drive circuit 6 to move the optical head 4 to a location a few BLOCKs a way from desired readout location while supervising the sub-coding signal reproduced by the optical head 4.

It is also possible to detect the location where the reproduced sub-coding signal completely coincides with the set sub-coding signal. In this example, to prevent such mal-operation that the reproduced sub-coding signal includes an error and a set sub-coding signal is not reproduced so as to terminate the search mode, the playback is started from the location apart from the correct block by a few blocks. The designated BLOCK is determined by counting the reproduced sub-coding signal, the frame sync signal and the header.

At the designated BLOCK or nearby, the micro-computer 18 within the interface 17 operates according to the flow chart as shown in FIG. 6. First of all, one WORD of the reproduced main channel digital data is taken in so as to discriminate whether the one WORD is that of the header or not. When the header is not detected at the beginning of the BLOCK, it means the jitter component is outside of the tolerance range so that error correction is carried out. When the header is detected, a determination is made whether or not the one WORD is the ID start signal.

After detecting the ID start signal, the ID signal, A0, A1, A2 and A3 is taken in. In this case, an effective ID signal is taken in, while supervising a flag attached to each WORD. Among 4 bytes of the ID signal, two bytes of A0 and A1 correspond with successive two bytes of L channel, and two bytes of A2 and A3 with successive two bytes of R channel. Because of this repetition, the ID signal of 4 bytes, A0, A1, A2 and A3 is effectively obtained as data.

This ID signal of 4 bytes A0, A1, A2 and A3 is checked to determine whether or not an address is designated. If an address is designated, the data of the BLOCK designated is read in by the microcomputer 18. If no address is designated the next BLOCK is read and a similar operation is performed.

An arrangement may be possible wherein an operating keyboard for the D/A converter and system controller 11 is added to the arrangement of one embodiment described above, thereby enabling the playback of the compact disc on which stereophonic musical signals have been recorded.

It may be possible to insert the accessing code signals for which the coding processing of the error correcting code has been performed in other R through W channels in the sub-coding signals.

According to the present invention, it is possible to realize a disc memory device having a much larger memory capacity than a conventional flexible disc, and to read out the digital signal in units of a size suitable for handling.

Moreover, according to the present invention, with a disc for playing back stereophonic musical signals such as an already commercially available compact disc, it is possible to record digital data other than the stereophonic musical signals while maintaining the consistency with respect to the signal format and signal processing such as the error correcting method and recording data format, or the like. Therefore, by adding a data processing section such as micro-computer, color CRT, and speaker as accessories to the standard disc player, it is possible to playback various picture information and audio information, thereby enabling enlargement of an application range of the disc.

What is claimed is:

1. A disc having recorded thereon
   a plurality of FRAMEs of main digital data and subdigital data, said subdigital data being used in playback of said disc to locate said main digital data,
   a predetermined number of said FRAMEs consituting one BLOCK,
   a header signal being included in the beginning of said BLOCK,
   an address signal following said header signal, and
   a time indication code contained in said subdigital data for locating a desired FRAME within said BLOCK.

2. Apparatus according to claim 1, wherein the length of said header signal corresponds to relative variation of the time base between the reproduced main digital data and the reproduced sub-digital data.

3. Apparatus according to claim 1, wherein said header signal includes a predetermined number of bytes each indicating the digital value "0".

4. Apparatus according to claim 1, wherein said address signal includes a start signal having bits of digital value of "1".

5. The disc playback apparatus according to claim 4, wherein said address data consists of a predetermined number of bytes indicating one address, said bytes being repeated at least once.

6. A method of using a disc for storing and playing back main digital data, comprising the steps of:
   adding subdigital data to said main digital data for use during playback in identifying and locating said main digital data;
   organizing said main digital data and said subdigital data into FRAMEs;
   including in said subdigital data a time indication code indicating a continuously changing absolute time duration from a beginning of the disc to an end thereof;
   organizing a predetermined number of said FRAMEs into one BLOCK;
   arranging a header signal at the beginning of each BLOCK, said header signal being formed of an even number of FRAMEs of the same digital value and in which each BLOCK is formed of said predetermined number of FRAMEs;
   arranging an address signal following each said header signal, said address signal including address data of a predetermined number of bytes that repeat themselves at least once; and
   playing back said recorded data utilizing said time indication code to determine a location of a preselected BLOCK and utilizing a reproduced length of said header signal to indicate a relative time base fluctuation between said main digital data and said subdigital data.

7. Apparatus for reproducing a digital signal recorded in a track of a record disc, comprising:
   a disc on which main digital data and subdigital data have been recorded, a predetermined amount of said main digital data and subdigital data being organized to form one FRAME, and a predetermined number of FRAMEs being assembled to form one BLOCK, a header signal being included in the beginning of said BLOCK, and an address signal following said header signal, said subdigital data including data sequentially changing along said track so as to locate a desired BLOCK, whereby said main digital data is selectively reproduced;
   spindle means for rotating said disc;
   signal reproducing means for obtaining reproduced main digital data and subdigital data from said disc;
   drive means for producing relative motion between said disc and said signal reproducing means in a direction that is radial with respect to said disc;
   separating means connected to said signal reproducing means for separating said reproduced main digital data from said reproduced subdigital data;
   memory means connected to said separating means for eliminating a time-base variation in said reproduced main digital data and producing time-base corrected main digital data; and
   control means connected to said spindle means, drive means and separating means and supplied with said reproduced subdigital data for controlling said spindle means and drive means, whereby a reproduced length of said header signal corresponds to a relative time base fluctuation between said time-base corrected main digital data and said reproduced subdigital data.

8. Apparatus according to claim 7, wherein said header signal includes a predetermined number of bytes, each indicating the digital value "0".

9. Apparatus according to claim 7, wherein said address signal includes a start signal having bits of digital value of "1" and address data.

10. Apparatus according to claim 9, wherein said address data consists of a predetermined number of bytes indicating one address, said bytes being repeated at least once.

* * * * *